UNITED STATES PATENT OFFICE.

NATHAN GOODMAN AND BENJAMIN GRUBMAN, OF NEW YORK, N. Y.

PROCESS OF MAKING RESORCINOL.

1,314,138.      Specification of Letters Patent.      Patented Aug. 26, 1919.

No Drawing.      Application filed July 18, 1918. Serial No. 245,445.

*To all whom it may concern:*

Be it known that we, NATHAN GOODMAN and BENJAMIN GRUBMAN, both citizens of the United States, and residents of the city of New York, in the county of New York and State of New York, have invented a certain new and useful Process of Making Resorcinol, of which the following is a specification.

This invention relates to the manufacture of resorcinol, which is very valuable for the preparation of dyes and for medicinal purposes, and its principal object is to provide an improved process of making this product, therewith the cost of the resulting resorcinol will be greatly reduced.

Other objects and advantages will hereinafter appear.

Heretofore, the commonly adopted method of making resorcinol consisted of fusing the sodium salts of meta and para benzene-disulfonic acids with caustic soda, acidifying the mixture, and extracting the resorcinol from the mixture by means of ether. The utilization of the ether, however, for the extraction of the resorcinol from the stated mixture renders its manufacture very expensive, for the reason that the ether itself is an expensive substance and that a large quantity thereof is continually lost by evaporation during the process, because of the low boiling point of ether.

In our tests with the production of resorcinol we found that by making a mixture of ether and benzol, which is much cheaper than ether, and utilizing this mixture in place of the ether in the step of extracting the resorcinol it carries out the identical function as efficiently as was formerly done with the use of ether solely, and thereby conduces greatly toward the economic production of the resorcinol. The solubility of this mixture in water is much lower than that of ether, so that a smaller loss of ether is incurred when extracting with the mixture. The boiling point of the said mixture of ether and benzol is much higher than that of ether and hence is not as much subject to evaporation. We have found that with the utilization of this mixture of ether and benzol the last traces of the solvent can be very readily driven off from the resorcinol residue by the application of little if any heat at all, whereas when ether is used a temperature of 140 degrees centigrade is necessary to drive off the last traces of the solvent, the reason being that the ether appears to have a strong affinity for the resorcinol, while when this mixture is used the benzol thereof tends to aid the separation of the ether from the resorcinol.

In carrying out our invention, we proceed with the making of the resorcinol as follows: Benzene is sulfonated with fuming sulfuric acid, and then the products are dissolved in water and treated with slaked lime. The calcium sulfate precipitate formed is then filtered, and the filtrate, which contains the calcium salt of the disulfonic acid, is then treated with sodium carbonate. A calcium carbonate precipitate which is now formed is filtered, and the filtrate, which contains the sodium salts of the meta and para benzene disulfonic acids is then evaporated to dryness. This sodium salt is now fused with a suitable alkali such as sodium hydroxid, and when cooled and solidified the fused mass is dissolved in water, which is then acidified. The solution is heated to boiling, the sulfur dioxid driven off, and then the solution is cooled and filtered. The resorcinol in the filtrate may be now extracted therefrom by means of a mixture of ether and benzol, upon the evaporation of which mixture the resorcinol remains. After evaporation, the distilled mixture of ether and benzol may be conserved and thereafter continually utilized in the repetition of the process. It will be evident that any desired method of extraction may be adopted for removing the resorcinol from the above mentioned solution with the utilization of the mixture of ether and benzol, and that the vital element of this step in the process is the utilization of this mixture.

Having thus described our invention, we claim:—

1. In a process of making resorcinol, the step of extracting the resorcinol with a mixture of ether and benzol.

2. In a process of making resorcinol, the step of extracting the resorcinol with a mixture of ether and another organic solvent.

Signed at the city of New York, in the county of New York, and State of New York, this 16th day of July, A. D. 1918.

NATHAN GOODMAN.
BENJAMIN GRUBMAN.